July 23, 1968          A. KRIVDA          3,393,523

TUNNEL LINING UNIT

Filed Feb. 14, 1967          2 Sheets-Sheet 1

INVENTOR
Alfred Krivda

BY *Webster & Webster*
ATTORNEYS

July 23, 1968  A. KRIVDA  3,393,523
TUNNEL LINING UNIT
Filed Feb. 14, 1967  2 Sheets-Sheet 2
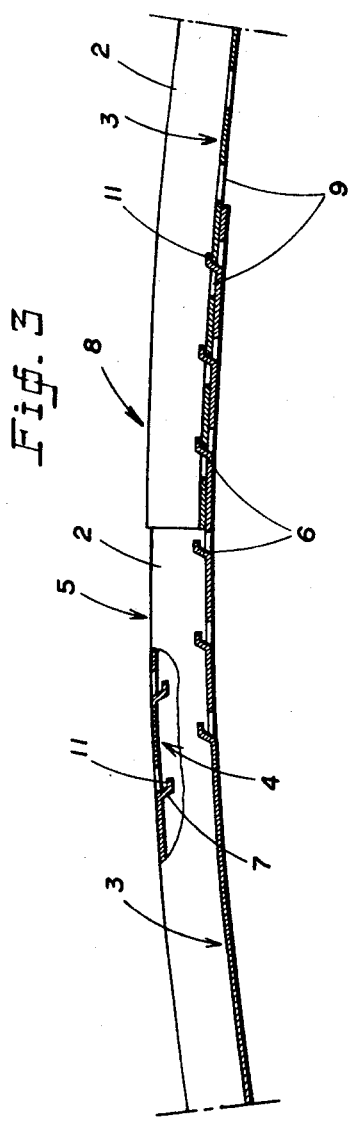
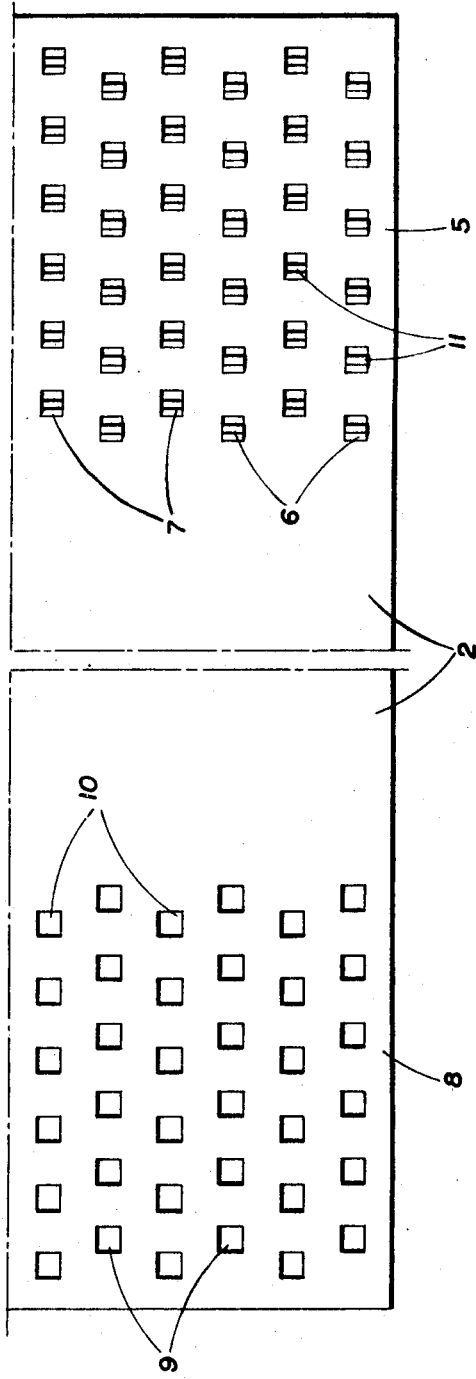

United States Patent Office 3,393,523
Patented July 23, 1968

3,393,523
TUNNEL LINING UNIT
Alfred Krivda, P.O. Box 1055, Oroville, Calif. 95965
Filed Feb. 14, 1967, Ser. No. 616,048
3 Claims. (Cl. 61—45)

ABSTRACT OF THE DISCLOSURE

A sheet metal lining unit for a substantially circular tunnel such as may be bored through heavy dirt, shale, or similar loose and unstable material which would require the tunnel to be shored to maintain the same against caving or collapse; the lining unit being prefabricated and sectional.

Background of the invention

Heretofore, such tunnels have frequently been lined with units, of heavy duty sheet metal, which individually comprise a number of arcuate or circumferential sections which lap each other at their adjacent ends and wherein the lapped end portions are bolted or similarly secured together; such a securing operation, as carried out inside the tunnel, being a difficult, time-consuming, and consequently expensive operation.

Summary of the invention

The present invention provides, as a major object, a tunnel lining unit—of prefabricated, sheet metal, sectional type—which avoids the use of bolts or the like for securing the lapped-end sections together and instead incorporates latching means which automatically engage when the lining sections of the unit are properly positioned in the tunnel in cooperating relation with each other and the lining as a whole expanded to dispose the same in close contact with the wall of the tunnel.

The present invention provides, as another object, a tunnel lining unit, as above, in which the automatic latching action will occur—without any manual adjustments being necessary—regardless of relatively small differences in the diameter of the tunnel in which the lining is placed.

The invention provides, as an additional object, a tunnel lining unit arranged so that the sections thereof can be readily assembled by workers in a tunnel and then quickly and easily expanded to the point of engagement of the latching means.

The invention provides, as a further object, a tunnel lining unit which is designed for ease and economy of manufacture.

A still further object of the invention is to provide a practical, reliable, and durable tunnel lining unit and one which is exceedingly effective for the purpose for which it is designed.

Brief description of the drawings

FIG. 3 is a fragmentary longitudinal section of the unit, taken on line 3—3 of FIG. 2.

FIG. 4 is a fragmentary, foreshortened, plan view of one of the sections of the unit.

In considering FIGS. 2 and 3, it is to be understood that FIG. 2 is a view extending lengthwise or axially of the tunnel, while FIG. 3 is a view extending circumferentially of the tunnel.

Description of the preferred embodiment

Figure 1:
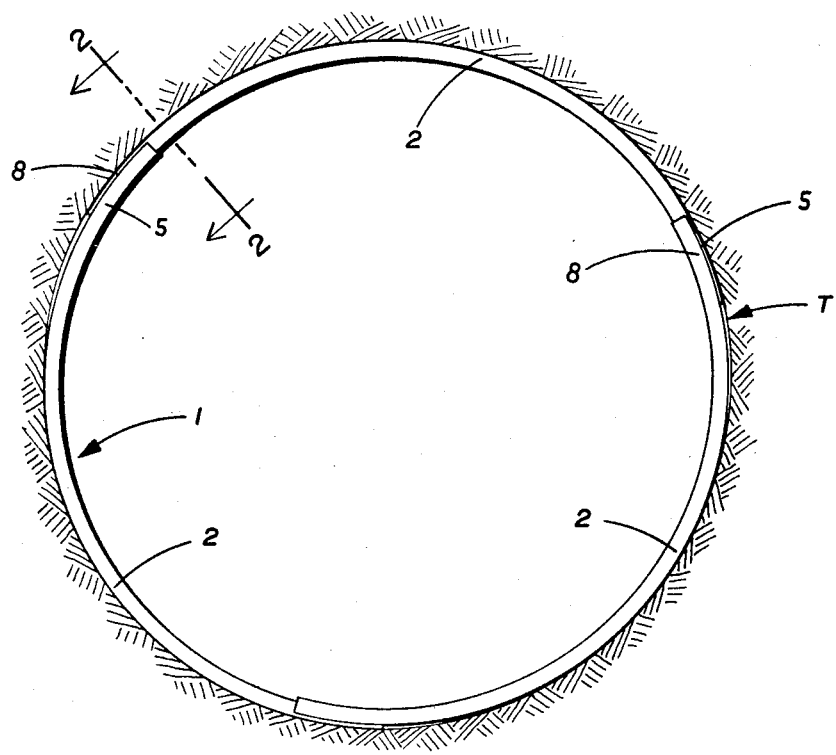
FIG. 1 is an end elevation of the improved tunnel lining unit, showing the same as installed in a tunnel.
Figure 2:
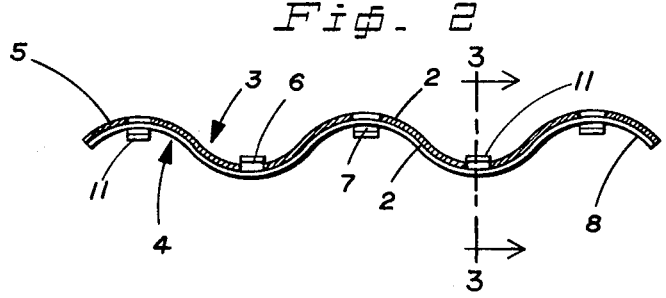
FIG. 2 is an enlarged fragmentary cross section of the unit, taken on line 2—2 of FIG. 1.

Referring now more particularly to the drawings and to the characters of reference marked thereon, the tunnel lining unit, indicated generally at 1, is preferably formed of sheet metal, curved so as to be concentric with the tunnel T, and comprises a plurality of arcuate initially separate sections 2, preferably three in number, and all of identical size. Such size is sufficiently in excess of 120 degrees in circumferential extent to enable the sections to overlap each other at adjacent ends for an appreciable distance when mounted in the tunnel, as will be evident from FIG. 1.

The actual circumferential extent of the sections 2 is determined by the diameter of the tunnel in which the lining unit is to be fitted, while the extent of the sections lengthwise of the tunnel is relatively short so that the sections may be readily manipulated by hand.

The sections 2 are preferably of corrugated form circumferentially thereof as shown, and thus provide alternating troughs 3 and 4 which face radially outwardly and inwardly, respectively.

One end portion 5 of each section 2 is formed with parallel longitudinal rows of catch lugs 6 which project into the troughs 3 at the bottom thereof and face in the direction of the adjacent end of said section, and with similarly facing, parallel longitudinal rows of catch lugs 7 projecting into the troughs 4. The lugs of the different rows are all spaced apart the same distance, but the rows of lugs 7 are preferably disposed in staggered relation to the rows of lugs 6, as shown in FIG. 4.

In the present instance and as here shown, the lugs 6 and 7 are integral with the sheet metal section 2 and are punched or struck out therefrom by any suitable means.

The other end portion 8 of each section 2 is provided with parallel longitudinal rows of holes 9 and 10 in the bottom of the troughs 3 and 4, respectievly; the spacing and positioning of which rows of holes 9 and 10 corresponding to or matching the related rows of lugs 6 and 7, respectively.

Upon the end portions 5 and 8 of adjacent sections 2 being overlapped in engagement, such sections are automatically latched together—upon slight relative movement in a direction tending to increase the lap—by virtue of resultant passage of lugs 6 or 7 through holes 9 or 10, as the case may be.

Each lug 6 and 7 is generally hook shaped, and extends from the related section 2 at a relatively sharp angle, so as to abut intermediate its ends against the trailing endwall of the hole, in the other section 2, through which the lug projects. Further, the outer end of each lug is in the form of a short lip 11, which is parallel to the circumferential face of said related section 2 but spaced therefrom so as to closely overlie said other section beyond said endwall when the lug is engaged therewith. This insures against the lug possibly slipping out of its hole when once fully engaged therein.

Since the lugs 6 and 7 project from opposite faces of the sections 2 in a definite order, the holding engagement of the lugs in the related holes will take place regardless of whether the end portion 8 of a section 2 is lapped radially out or radially in from the end portion 5 of an adjacent section.

To place the lining in a tunnel T, two of the section 2 are first positioned therein with the adjacent end portions 5 and 8 in lapped and latched relation; such lapped end portions preferably being disposed at the bottom of the tunnel so that said sections at their then upper ends lean against the wall of the tunnel, and tend to remain in that position without falling or having to be braced. When thus positioned, the end portion 5 of one section 2 is uppermost, while the end portion 8 of the other section 2 is uppermost.

The remaining section 2 is then lifted into position, with the end portion 8 thereof lapping and latched to the adjacent end portion 5 of one already erected section, and with the end portion 5 of said remaining section lapping and latched to the adjacent end portion 8 of the other erected section 2, as shown in FIG. 1. As so initially assembled in the tunnel, the lining is relatively loose but is then expanded—to firmly engage the wall of the tunnel—in the following manner:

The lapped end portions 5 and 8 (at least one set thereof) are forced to relatively move in a direction tending to decrease the lap and which results in the lugs overrunning the holes in ratchet fashion. This causes the lining as a whole to expand until it is very tight in the tunnel and at which time the expanding force is released from the lapped end portions 5 and 8. Thereupon, under the tension of the expanded lining, said lapped end portions 5 and 8 relatively move slightly in a direction tending to increase the lap and as a consequence an automatic latching thereof occurs in the manner previously described. The sections of the lining then remain latched together with the lining tight in the tunnel.

The desired expanding pressure or force may be applied from within the tunnel and to adjacent end portions 5 and 8 by means of any suitable form of expanding tool (such as a power jack); the ends of which are adapted to be detachably engaged in locating relation with exposed holes and lugs in said adjacent end portions 5 and 8.

The use of corrugated sheet metal for the lining sections not only strengthens the same without excessive weight but protects the projecting lugs 6 and 7, which are in the corrugation troughs, against possible damage by contact with exterior obstructions when the sections are being handled. Also, the corrugations permit each unit of the lining to mate with the adjacent units.

From the foregoing description, it will be readily seen that there has been produced such a tunnel lining unit as substantially fulfills the objects of the invention, as set forth herein.

While this specification sets forth in detail the present and preferred construction of the tunnel lining unit, still in practice such deviations from such detail may be resorted to as do not form a departure from the spirit of the invention, as defined by the appended claims.

I claim:

1. A lining unit for a tunnel, comprising a plurality of initially separate arcuate sections together adapted to completely line a portion of the tunnel with the adjacent end portions of adjacent sections then closely lapping each other, the sections being corrugated to provide peripherally extending troughs facing inwardly and outwardly in alternating order, and automatic latching means on said lapping end portions of the sections preventing circumferential contraction of the unit; the latching means comprising projecting lugs on one end portion and holes in the other end portion to cooperate with and receive the lugs therethrough in holding relation, certain of the lugs being in the bottom of and projecting into the inwardly facing troughs, and the other and remaining lugs being in the bottom of and projecting into the outwardly facing troughs.

2. A lining unit, as in claim 1, in which each lug is angled in the direction of the outer end of the corresponding lapping end portion, with a lip projecting from the outer end of the lug parallel to the adjacent face of said corresponding lapping end portion.

3. A lining unit, as in claim 1, in which said other lugs are offset relative to said certain lugs in a direction lengthwise of the troughs.

References Cited
UNITED STATES PATENTS

| | | | |
|---|---|---|---|
| 2,350,113 | 5/1944 | Hurley | 61—41 X |
| 2,750,749 | 6/1956 | Brown et al. | 61—45 |
| 3,097,494 | 7/1963 | Chapron | 61—45 |

OTHER REFERENCES

| | | |
|---|---|---|
| 1,101,823 | 4/1955 | France. |
| 496,475 | 11/1938 | Great Britain. |
| 901,224 | 7/1962 | Great Britain. |

JACOB SHAPIRO, *Primary Examiner.*